US011464356B2

(12) United States Patent
Dolfini

(10) Patent No.: US 11,464,356 B2
(45) Date of Patent: Oct. 11, 2022

(54) METHOD AND SYSTEM FOR COFFEE CAPSULE RECOGNITION

(71) Applicant: TELECOM ITALIA S.p.A., Milan (IT)

(72) Inventor: Danilo Dolfini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 392 days.

(21) Appl. No.: 16/649,420

(22) PCT Filed: Sep. 21, 2018

(86) PCT No.: PCT/EP2018/075592
§ 371 (c)(1),
(2) Date: Mar. 20, 2020

(87) PCT Pub. No.: WO2019/057886
PCT Pub. Date: Mar. 28, 2019

(65) Prior Publication Data
US 2020/0297155 A1 Sep. 24, 2020

(30) Foreign Application Priority Data
Sep. 25, 2017 (IT) .................. 102017000106755

(51) Int. Cl.
*A47J 31/00* (2006.01)
*A47J 31/44* (2006.01)
(52) U.S. Cl.
CPC .................. *A47J 31/4492* (2013.01)
(58) Field of Classification Search
CPC .................................. A47J 31/4492
(Continued)

(56) References Cited

U.S. PATENT DOCUMENTS

2003/0066431 A1  4/2003  Fanzutti et al.
2011/0151075 A1  6/2011  Peterson
(Continued)

FOREIGN PATENT DOCUMENTS

CN       1922096 A    2/2007
CN     201426353 Y    3/2010
(Continued)

OTHER PUBLICATIONS

Combined Chinese Office Action and Search Report dated Jun. 10, 2021 in Chinese Patent Application No. 201880061524.8 (submitting English translation only), 8 pages.
(Continued)

*Primary Examiner* — Daniel A Hess
(74) *Attorney, Agent, or Firm* — Oblon, McClelland, Maier & Neustadt, L.L.P.

(57) ABSTRACT

It is disclosed a method and system for recognizing coffee capsules used by a capsule coffee machine, wherein a vibration sensor is arranged within the capsule coffee machine to detect vibrations of a machine component (e.g. the pump, or the capsule holder, or the hydraulic circuit connecting the pump with the capsule holder) rigidly connected with the coffee capsule fitted in the machine during the brewing of a coffee beverage. As the brewing is started, the vibration sensor detects the vibrations to which the machine component (and all the other machine components rigidly connected thereto during the brewing, including the variable-mass coffee capsule) is subjected, and generates a vibration signal corresponding thereto. The vibration signal is then processed for determining at least one parameter thereof. The coffee capsule is then recognized based on the value of the determined parameter(s).

15 Claims, 8 Drawing Sheets

(58) Field of Classification Search
USPC ........................................................ 426/231
See application file for complete search history.

(56) References Cited

U.S. PATENT DOCUMENTS

| | | | |
|---|---|---|---|
| 2012/0231126 A1 | 9/2012 | Lo Faro et al. | |
| 2014/0252093 A1* | 9/2014 | Jarisch | G06K 7/1421 235/494 |
| 2015/0144001 A1 | 5/2015 | Lo Foro et al. | |
| 2015/0147448 A1 | 5/2015 | Lo Foro et al. | |
| 2015/0320255 A1 | 11/2015 | She et al. | |
| 2017/0202247 A1 | 7/2017 | Lo Faro et al. | |
| 2017/0360242 A1* | 12/2017 | Boggavarapu | A47J 31/407 |
| 2018/0289204 A1 | 10/2018 | Lo Faro et al. | |
| 2018/0336512 A1* | 11/2018 | Clarke | A47G 29/14 |
| 2018/0344075 A1 | 12/2018 | Zwicker et al. | |

FOREIGN PATENT DOCUMENTS

| | | |
|---|---|---|
| CN | 102395304 A | 3/2012 |
| CN | 103188974 A | 7/2013 |
| CN | 103946870 A | 7/2014 |
| CN | 104394742 A | 3/2015 |
| CN | 104771077 A | 7/2015 |
| CN | 105813515 A | 7/2016 |
| CN | 105996782 A | 10/2016 |
| CN | 106490979 A | 3/2017 |
| CN | 106659314 A | 5/2017 |
| CN | 106659325 A | 5/2017 |
| CN | 106927152 A | 7/2017 |
| CN | 107108113 A | 8/2017 |
| EP | 3 175 745 A1 | 6/2017 |
| FR | 2 895 738 A1 | 7/2007 |
| WO | WO 2009/098392 A1 | 8/2009 |
| WO | WO 2010/148160 A2 | 12/2010 |
| WO | WO 2012/064885 A1 | 5/2012 |
| WO | WO 2014/110724 A1 | 7/2014 |
| WO | WO 2015/091301 A1 | 6/2015 |
| WO | WO 2017/134544 A1 | 8/2017 |

OTHER PUBLICATIONS

International Search Report and Written Opinion dated Jan. 4, 2019 in PCT/EP2018/075592 filed Sep. 21, 2018.

* cited by examiner

METHOD AND SYSTEM FOR COFFEE CAPSULE RECOGNITION

TECHNICAL FIELD

The present invention relates to the field of coffee machines or, more in general, infusion brewing machines. In particular, the present invention relates to a method and system for recognizing coffee capsules used by a capsule coffee machine.

BACKGROUND ART

As known, a coffee capsule basically is a single-serve container containing coffee powder, having rigid walls (typically made of plastics or aluminium) and two bases through which hot water under pressure may pass.

A capsule coffee machine typically comprises a capsule holder suitable for receiving and tightly sealing a coffee capsule when a single-serve coffee beverage (e.g. an expresso) has to be brewed. The machine also comprises a pump drawing hot water from a boiler and introducing it through a hydraulic circuit into the capsule holder under pressure. The hot water under pressure percolates through the coffee powder within the capsule and the coffee beverage is eventually dispensed in a cup through a dispensing duct hydraulically connected with the capsule holder.

A capsule coffee machine or, more in general, a pressure infusion brewing machine, is typically capable of operating with capsules of different types, for instance capsules containing powders of different 5 types (different coffee blends or flavours, tea, herbal tea, soup, chocolate, etc.) offered on the market by a vendor, or even with capsules offered on the market by different vendors, e.g., coffee vendors. In the latter case, the shape and size of the coffee capsules shall be substantially the same for all the coffee vendors wishing their coffee capsules to be compatible with a certain capsule coffee machine. The properties of the powder within the capsules (e.g. coffee blend, powder grinding degree, powder compression degree, etc.) may instead vary from vendor to vendor.

Techniques are known for automatically recognizing coffee capsules used by a capsule coffee machine.

US 2003/0066431 describes a coffee maker for pods whose rear ends have different shapes based on what is contained inside the pod (e.g. a pod having one type of flavoured coffee could have one type of rear end shape and a pod having another type of flavoured coffee or coffee and artificial sweetener or nondairy creamer could have a different rear end shape). The coffee maker comprises a sensor adapted to sense the shape of the pod rear end and send a signal to a controller, which accordingly determines what type of pod is present and—based on this determination—can select a predetermined coffee brewing setting for delivering of the water into the pod.

WO 2015/091301 discloses a beverage dispenser with a consumable recognition system for recognizing the type of consumable containing a food substance for the preparation of a beverage. The system comprises a light sensor for sensing light reflected from a reflection element of the consumable during a relative movement between consumable and light sensor to obtain a sensor signal, which depends on the position, reflectivity and/or pattern of the reflection element.

WO 2009/098392 describes a beverage dispensing machine provided with a pod recognition device for recognizing a pod containing ingredients for preparing different types of beverages. The pod includes a casing including at least two coloured identification areas. The recognition device includes means for detecting the colour of the two coloured identification areas of the pod.

SUMMARY OF THE INVENTION

The Applicant has noticed that the above recognition techniques have some drawbacks.

All the above known techniques indeed basically require providing each pod to be recognized with a special feature (shape of the rear end, reflection element or coloured identification areas) on its outer surface, which may be sensed by a suitable sensor of the coffee machine as the pod is inserted therein. The provision of such special feature however disadvantageously increases the manufacturing cost of the pods.

Besides, the implementation of the sensors needed to recognize such special feature of the coffee pod within the coffee machine increases the cost and complexity of the machine.

Furthermore, the implementation of such sensors (especially light sensors) within the coffee machine may be very difficult, taking into account that the environment within a coffee machine typically exhibits conditions unfavourable to a proper sensor operation (high humidity and darkness). This may lead to unreliable recognition results.

In view of the above, the Applicant has tackled the problem of providing a method and system for recognizing a coffee capsule used by a coffee capsule machine, which overcomes the aforesaid drawbacks.

In particular, the Applicant has tackled the problem of providing a method and system for recognizing a coffee capsule used by a capsule coffee machine, which does not require providing the coffee capsule with any special feature at recognition purposes, which does not require any costly or complex modification of the capsule coffee machine and which provides reliable results.

According to embodiments of the present invention, the above problem is solved by a method and system for recognizing coffee capsules, which relies on the inventors' insight that, in a capsule coffee machine under use, the capsule holder with the coffee capsule tightly fitted therein forms, together with any machine component rigidly connected thereto (typically, the pump and the hydraulic circuit connecting the pump with the capsule holder), a unique, rigid mechanical system having a variable mass m(t). The mass m(t) of such mechanical system increases in time while the coffee beverage is being brewed, because of the hot water absorbed by the coffee powder within the coffee capsule. The mass m(t) in particular starts from an initial value $m_0$ (no water in the coffee capsule) and asymptotically tends to a saturation value $m_{SAT}$ (coffee powder become saturated by water) during the brewing.

When the pump is switched on for starting the brewing, it starts vibrating at the same frequency $f_{MAIN}$ as the mains electricity (e.g. 50 Hz in Europe). Since, as described above, the pump is part of a unique rigid mechanical system, the whole mechanical system vibrates at the same frequency $f_{MAIN}$. The amplitude of the vibrations depends on the time-variable mass m(t), according to known dynamics laws.

In particular, the Applicant has modelled the behaviour of the vibrating mechanical system as schematically depicted in FIG. 1, namely as an object O with variable mass m(t) constrained by a spring with elasticity modulus k and subjected to an external force.

In FIG. 1, the external force $F_V(t)$ is a harmonic component with frequency f and constant peak amplitude $F_{max}$ (natural vibration of the object O), which is equal to:

$$\vec{F}_V(t) = F_{max} \cdot \sin(2\pi f t) \quad [1]$$

In FIG. 1, $F_H(t)$ is instead the elastic component of the force applied to the object O, which takes into account that the object O is constrained and that accordingly its average position shall be fixed (the object O oscillates about a same position, but it does not displace). In order to model this aspect, the known Hooke's law may be used, namely:

$$\vec{F}_H(t) = k \cdot \Delta x(t) \quad [2]$$

where $\Delta x(t)$ is the offset of the position of the object O relative to the average position. By neglecting the dissipative component due to the viscose friction (which as known is directly proportional to the speed of the object O), the following equation is therefore obtained:

$$\vec{F}(t) \approx \vec{F}_V(t) - \vec{F}_H(t) \quad [3]$$

Since the mass m(t) of the object O is not constant, the Newton law F=m·a can not be applied. Instead, the more general form of the second dynamics' law shall be used, according to which the variation in time of the momentum $\vec{p}$ of an object O equals the overall force applied thereto. Since, as known, the momentum $\vec{p}$ is defined as the product of mass and speed, the following motion equation is obtained:

$$\vec{F}(t) = \frac{d\vec{p}}{dt} = \frac{d(m \cdot \vec{v})}{dt} = \frac{dm}{dt} \cdot \vec{v} + m \cdot \frac{d\vec{v}}{dt} \quad [4]$$

By combining the above equations, it may be derived that the vibration amplitude starts from an initial value (which mainly depends on $m_0$ and the force applied to the pump) and exponentially decreases by tending to an asymptotic value. The vibration amplitude for a certain coffee capsule may be therefore described by one or more parameters, e.g. by the following parameters:

asymptotic value of the vibration amplitude; and
saturation time, namely elapsed time since start of the brewing, upon which the vibration amplitude definitively falls below a certain predefined threshold.

The Applicant has performed several tests and found that a same capsule coffee machine used with coffee capsules of different types (for instance, coffee capsules of different vendors) provides vibration amplitudes with different asymptotic values and/or different saturation times, depending on the type of coffee capsule used. Such parameters may be accordingly used for recognizing coffee capsules of different types which are used by the coffee machine.

According to embodiments of the present invention, the above problems are therefore solved by a method and system for recognizing coffee capsules used by a capsule coffee machine, wherein a vibration sensor is arranged within the capsule coffee machine to detect vibrations of a machine component (e.g. the pump, or the capsule holder, or the hydraulic circuit connecting the pump with the capsule holder) rigidly connected with the coffee capsule fitted in the machine during the brewing of a coffee beverage. As the brewing is started, the vibration sensor detects the vibrations to which the machine component (and all the other machine components rigidly connected thereto during the brewing, including the variable-mass coffee capsule itself) is subjected, and generates a vibration signal corresponding thereto. The vibration signal is then processed for determining at least one parameter thereof. The coffee capsule is then recognized based on the value of the determined parameter(s).

The method and system of the present invention advantageously do not require providing the coffee capsules with any special feature for recognition purposes. The capsule recognition is indeed based on recognition of features (namely, the value of the parameter(s) of the vibration signal) which are inherent to the coffee capsule and exclusively depend on its behaviour during the brewing. Hence, advantageously, no extra manufacturing costs are needed in order to make the coffee capsule recognizable.

Besides, advantageously, the method and system of the present invention basically do not require any costly or complex modification of the capsule coffee machine. The vibration sensor is indeed a cheap component, which may be easily installed on coffee machines with a negligible increase of their cost and complexity.

Differently from a light sensor, moreover, the vibration sensor may carry out its recognition function even if it is not positioned in the immediate vicinity of the coffee capsule and capsule holder. It is indeed sufficient to position the vibration sensor at any point of the unique, rigid mechanical system of which the coffee capsule and capsule holder are part. Hence, the vibration sensor may be conveniently positioned far from the moist area of the coffee capsule and capsule holder, in more a favourable environment (e.g. on the pump) where it may operate in a more proper and reliable way.

According to a first aspect, the present invention provides a method for recognizing a coffee capsule used by a capsule coffee machine, the method comprising:

a) while a coffee beverage is brewed by the capsule coffee machine using the coffee capsule fitted therein, detecting vibrations of a component of the capsule coffee machine, the component being rigidly connected with the coffee capsule within the machine, and generating a vibration signal v(t) corresponding thereto;

b) determining the value of at least one parameter of the vibration signal v(t); and c) recognizing the coffee capsule based on the value of the at least one parameter.

Preferably, step a) comprises detecting vibrations of a pump of the capsule coffee machine while the pump is supplied by mains electricity, the pump being rigidly connected by means of a hydraulic circuit to a capsule holder of the capsule coffee machine, the coffee capsule being fitted in the capsule holder.

Preferably, step a) is performed by a vibration sensor arranged at the pump.

Preferably, step b) comprises determining a vibration amplitude V(t) as an envelope of the vibration signal v(t).

Preferably:

step b) comprises determining the values of a first parameter and a second parameter of the vibration amplitude V(t); and step c) comprises recognizing the coffee capsule based on the values of the first parameter and the second parameter of the vibration amplitude V(t).

Preferably, the first parameter comprises an asymptotic value $V_\infty$ of the vibration amplitude V(t) and the second parameter comprises a saturation time $\tau$ of the vibration amplitude V(t).

Preferably, step c) comprises:

defining a first coffee capsule type as a first set of coffee capsules having the at least one parameter comprised in a first range;

defining a second coffee capsule type as a second set of coffee capsules having the at least one parameter comprised in a second range; and determining whether the coffee capsule belongs to the first coffee capsule type or the second coffee capsule type based on whether the value of the at least one parameter determined for the coffee capsule is comprised in the first range or the second range.

Preferably, step c) comprises:

calculating a score indicative of how much the value of the least one parameter determined for the coffee capsule leans towards the first range or the second range, the score being positive if the value of the at least one parameter leans towards the first range and the score being negative if the value of at the least one parameter leans towards the second range; and determining whether the coffee capsule belongs to the first coffee capsule type or the second coffee capsule type based on a sign of the score.

Preferably, calculating the score comprises calculating a first partial score based on the value of the first parameter, calculating a second partial score based on the value of the second parameter and calculating the score by combining the first partial score and the second partial score.

Preferably, combining the first partial score and the second partial score comprises calculating a linear combination of the first partial score and the second partial score.

Preferably, step c) further comprises calculating a reliability score that provides a quantitative indication of the reliability of the coffee capsule recognition of the coffee capsule based on the sign of the score.

Preferably, reliability score is calculated based on an absolute value of the score.

Preferably, step b) is performed at the capsule coffee machine and the determined value of the at least one parameter of the vibration signal v(t) is transmitted by the capsule coffee machine to a remote processor by means of a network interface of the capsule coffee machine.

Preferably, the network interface is a mobile radio interface.

According to a second aspect, the present invention provides a system for recognizing a coffee capsule used by a capsule coffee machine, the system comprising:

a vibration sensor configured to, while a coffee beverage is brewed by the capsule coffee machine using the coffee capsule fitted therein, detect vibrations of a component of the capsule coffee machine, the component being rigidly connected with the coffee capsule within the machine, and generate a vibration signal v(t) corresponding thereto;

a pre-processor configured to determine the value of at least one parameter of the vibration signal v(t); and a processor configured to recognize the coffee capsule based on the value of the at least one parameter.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 2:
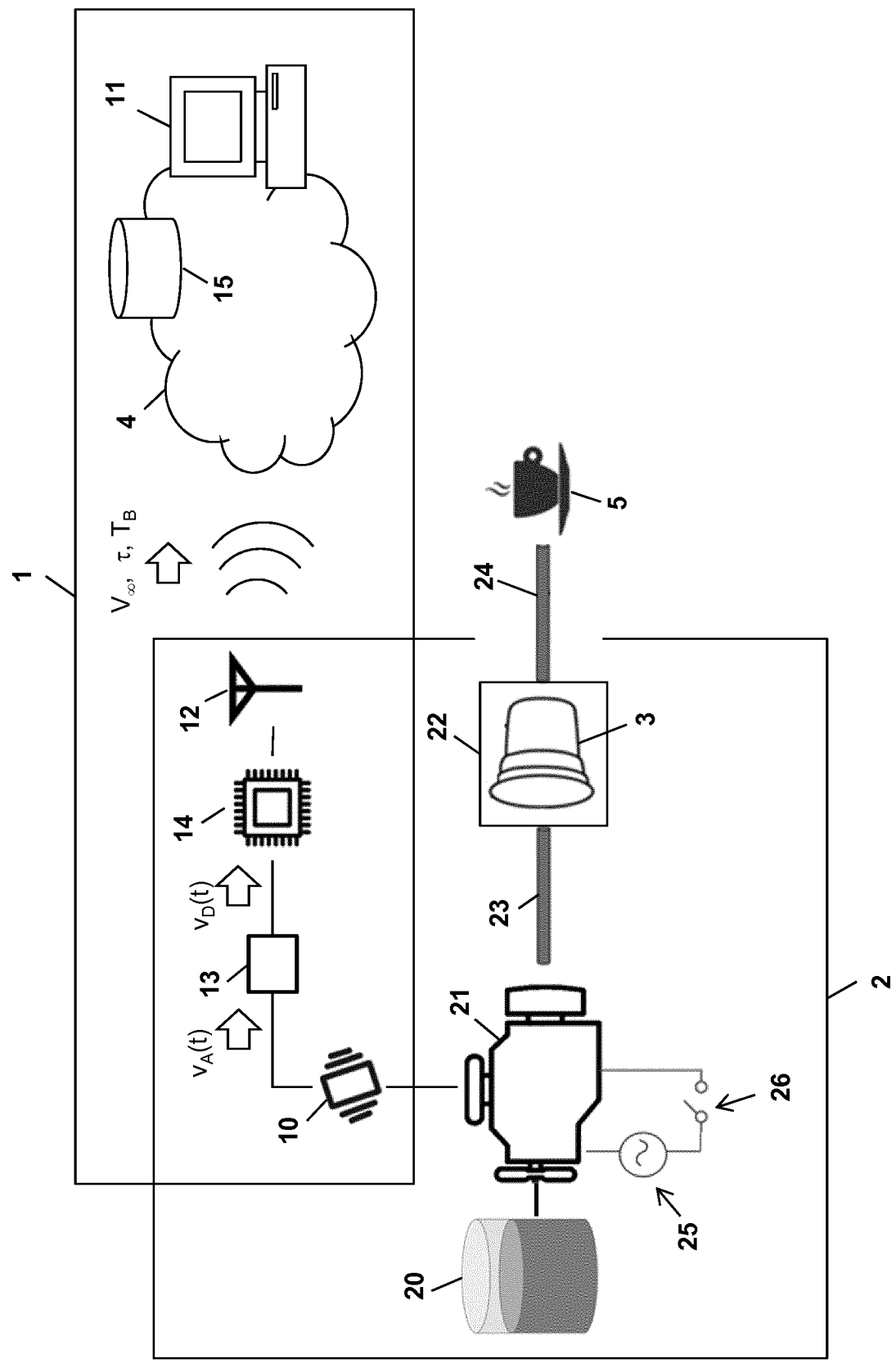
FIG. 2 schematically shows a system for recognizing coffee capsules used by a capsule coffee machine, according to an embodiment of the present invention.

FIG. 2 schematically shows a system 1 for recognizing coffee capsules used by a capsule coffee machine 2, according to an embodiment of the present invention.

The capsule coffee machine 2 comprises a boiler 20, a pump 21, a capsule holder 22, a hydraulic circuit 23 connecting the pump 21 with the capsule holder 22 and a dispensing duct 24 hydraulically connected with the capsule holder 22. The pump 21 is preferably provided with a power supply circuit 25 having an electric switch 26. The capsule holder 21 is configured to receive and tightly seal a coffee capsule 3 having size and shape matching its own size and shape.

From the mechanical point of view, the pump 21, the hydraulic circuit 23, the capsule holder 22 and the coffee capsule 3 tightly sealed therein are rigidly connected, so as to form a unique, rigid mechanical system.

The machine 2 typically comprises other components, which are not described in detail herein after since they are not relevant to the present description.

The system 1 preferably comprises a vibration sensor 10 arranged within the capsule coffee machine 2 to detect vibrations of a machine component rigidly connected with the coffee capsule 3 fitted in the coffee machine 2 during brewing of a coffee beverage. According to the embodiment shown in FIG. 2, the vibration sensor 10 is arranged at the pump 21, to detect vibrations thereof. This is not limiting. Indeed, according to other embodiments not shown in the drawings, the vibration sensor 10 may be arranged at any component rigidly connected with the coffee capsule 3 fitted in the capsule holder 22, e.g. the hydraulic circuit 23 or the capsule holder 22 itself.

The system 1 also preferably comprises a processor 11 configured to cooperate with the vibration sensor 10 and a central database 15 accessible by the remote processor 11.

According to some embodiments (not shown in the drawings), the processor 11 may be implemented within the machine 2.

According to other advantageous embodiments, the processor 11 of the system 1 is implemented as a remote processor to which the vibration sensor 10 is connected, as shown in FIG. 2. In this latter case, the remote processor 11 is preferably implemented in a distributed way within a communication network 4, e.g. by means of a cloud computing technique.

Preferably, at the purpose of implementing the connection between vibration sensor 10 and remote processor 11, the system 1 preferably comprises a network interface 12 arranged within the capsule coffee machine 2 and capable of connecting to the communication network 4.

The network interface 12 preferably is a wireless network interface configured to implement an autonomous and substantially permanent wireless connection between the machine 2 (in particular, the sensor 10) and the communication network 4 (in particular, the remote processor 11). The network interface 12 preferably is a mobile radio interface (e.g. a 3G interface). In this case, the network interface 12 is preferably provided with a SIM card (e.g. an eSIM) allowing unique identification of the machine 2 at the remote processor 11.

Alternatively, the network interface 12 may be a short range wireless interface, such as a Wi-Fi interface capable of connecting to said communication network 4 via a corresponding Wi-Fi router installed at the user's premises, or a Bluetooth interface capable of connecting to said communication network 4 via a personal mobile device of the user provided with a corresponding Bluetooth interface and a mobile radio connectivity to the communication network 4.

As shown in FIG. 2, the system 1 also preferably comprises an ADC (analog-to-digital converter) 13 and a pre-processor 14. Both the ADC 13 and the pre-processor 14 are preferably arranged within the machine 2, between the vibration sensor 10 and the network interface 12.

In order to brew a single-serve coffee beverage (e.g. an expresso), the user fits the coffee capsule 3 into the capsule holder 22 and starts the coffee machine 2 by acting upon the switch 26.

As the pump 21 is supplied by the mains electricity via the power supply circuit 25, it starts drawing hot water from the boiler 20 and introducing it through the hydraulic circuit 23 into the capsule holder 22 under pressure. The hot water under pressure percolates the coffee powder within the capsule 3 and the coffee beverage is eventually dispensed in a cup 5 through the dispensing duct 24.

Besides, as the pump 21 is supplied by the mains electricity via the power supply circuit 25, it starts vibrating at the same frequency $f_{MAIN}$ as the mains electricity (e.g. 50 Hz in Europe). Since, as discussed above, the pump 21 is part of a unique rigid mechanical system including at least the capsule holder 22, the hydraulic circuit 23 connecting the pump 21 with the capsule holder 22 and the coffee capsule 3 tightly fitted in the capsule holder 22, the amplitude of the vibrations depends on the mass of the whole mechanical system which, as described above, is a variable mass m(t) that increases in time during the brewing, because of the hot water absorbed by the coffee powder within the coffee capsule 3. In particular, as described above, the vibration amplitude starts from an initial value (which mainly depends on $m_0$ and the force applied to the pump 21) and exponentially decreases by tending to an asymptotic value.

While the machine 2 operates as described above, during the brewing of the coffee beverage the system 1 performs a number of steps for recognizing the coffee capsule 3.

Figure 4:
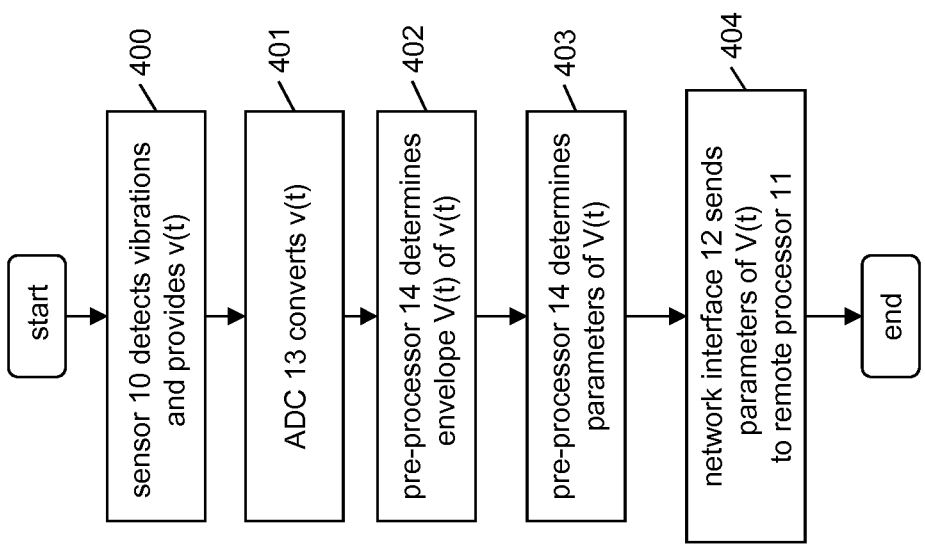
FIG. 4 is a flow chart of a first part of the recognition method implemented by the system of FIG. 1, according to an embodiment of the present invention.

With reference to the flow chart of FIG. 4 as the pump 21 starts vibrating as described above, the vibration sensor 10 detects such vibrations and provides a corresponding vibration signal v(t) indicative of such vibrations (step 400). The vibration signal v(t) preferably is an analog electrical signal.

Figure 3:
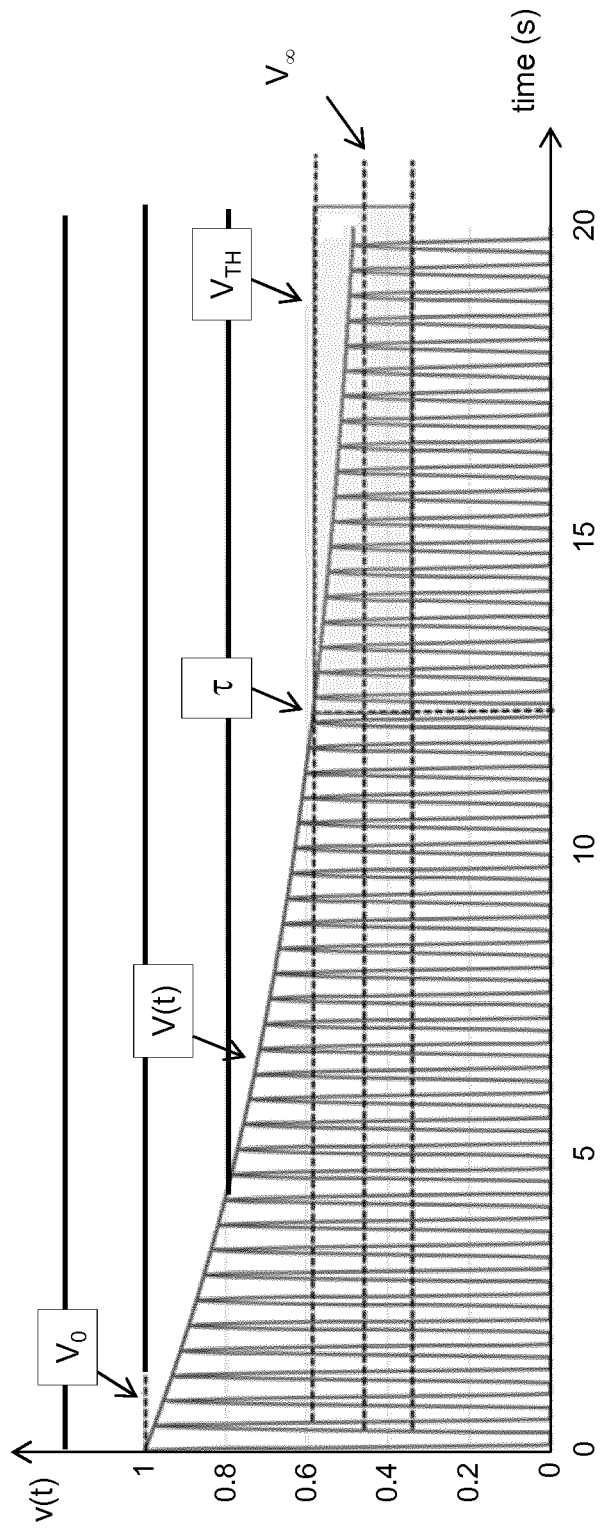
FIG. 3 shows a graph of the vibration signal v(t) obtained by modelling the behaviour of the vibrating mechanical system within the capsule coffee machine (positive half-wave only)

FIG. 3 shows a graph of the vibration signal v(t) (normalized with respect to its start value—only the positive half-wave is shown for simplicity) obtained by modelling the above described behaviour of the vibrating mechanical system within the coffee machine 2 as described above with reference to FIG. 1. FIG. 3 also shows the vibration amplitude V(t), which is defined as the envelope of the vibration signal v(t).

As it may be appreciated in FIG. 3, the vibration signal v(t) basically is a sinusoid whose amplitude V(t) exponentially decreases according to the following equation:

$$V(t)=V_\infty+(V_0-V_\infty)*e^{-t/\tau} \qquad [5]$$

where $V_0$ is the start value, $V_\infty$ is the asymptotic value and $\tau$ is the saturation time, namely the time lapsed since start of the brewing, upon which the vibration amplitude V(t) definitively falls below a threshold $V_{th}=V_\infty+\Delta V$, wherein $\Delta V$ has a predefined value. $\Delta V$ is preferably comprised between 1.05 $V_\infty$ and 1.5 $V_\infty$, for instance it may be equal to 1.1 $V_\infty$.

Then, the ADC 13 preferably converts the vibration signal v(t) from analog to digital (step 401).

Then, after the brewing of the coffee beverage is finished, the pre-processor 14 preferably processes the digitalized vibration signal v(t) to determine its envelope, corresponding to the vibration amplitude V(t) (step 402).

Then, the pre-processor 14 preferably processes the vibration amplitude V(t) to provide one or more of the following parameters (step 403):
  asymptotic value $V_\infty$ of the vibration amplitude V(t);
  saturation time $\tau$ of the vibration amplitude V(t); and
  brewing duration $T_B$, namely the overall brewing time.

Then, the network interface 12 preferably sends the parameter(s) provided by the pre-processor 14 to the remote processor 11 (step 404). The parameter(s) are preferably sent together with an identifier of the coffee machine 2. If the network interface 2 is a mobile radio interface, the identifier of the coffee machine 2 may be for instance the IMSI/ICCID associated with the SIM card of the network interface 12. The remote processor 11 preferably stores the received data in the central database 15.

Based on the data received from the pre-processor 14, the processor 11 preferably recognizes the coffee capsule 3. In particular, the processor 11 preferably recognizes the coffee capsule 3 based on the asymptotic value $V_\infty$ and/or based on the saturation time $\tau$.

In principle, recognition may be based on either $V_\infty$ or $\tau$ only. For instance, the processor 11 may recognize the coffee capsule 3 by applying a clustering technique (e.g. the known K-means technique), thereby grouping the coffee capsules into two or more different types, each type being defined by a certain range of values for $V_\infty$ or by a certain range of values for $\tau$.

For instance, the following types of coffee capsules may be defined:
  type T1 including coffee capsules having asymptotic values $V_\infty$ above a certain threshold $V_{\infty,TH}$ or saturation times $\tau$ below a certain threshold $\tau_{TH}$; and
  type T2 including coffee capsules having asymptotic values $V_\infty$ below the threshold $V_{\infty,TH}$ or saturation times $\tau$ above the threshold $\tau_{TH}$.

For instance, type T1 may correspond to coffee capsules from a certain vendor, while type T2 may correspond to coffee capsules from any other vendor, or coffee capsules from another specific vendor. In any case, the definition of each type T1, T2 of coffee capsules based on the value of $V_\infty$ or $\tau$, as well as the value of the threshold $V_{\infty,TH}$ or $\tau_{TH}$, is preferably performed empirically during a calibration step preceding application of recognition method, by measuring the value of $V_\infty$ or $\tau$ for several coffee capsules of both types T1 and T2.

The Applicant has noticed that performing recognition of coffee capsules by applying a clustering technique in a dimension only (either $V_\infty$ or $\tau$) may however lead to unreliable results. Noise and other disturbing factors indeed may create an uncertainty zone about the thresholds $V_{\infty,TH}$ and $\tau_{TH}$, as schematically depicted in FIG. 5.

Figure 5:
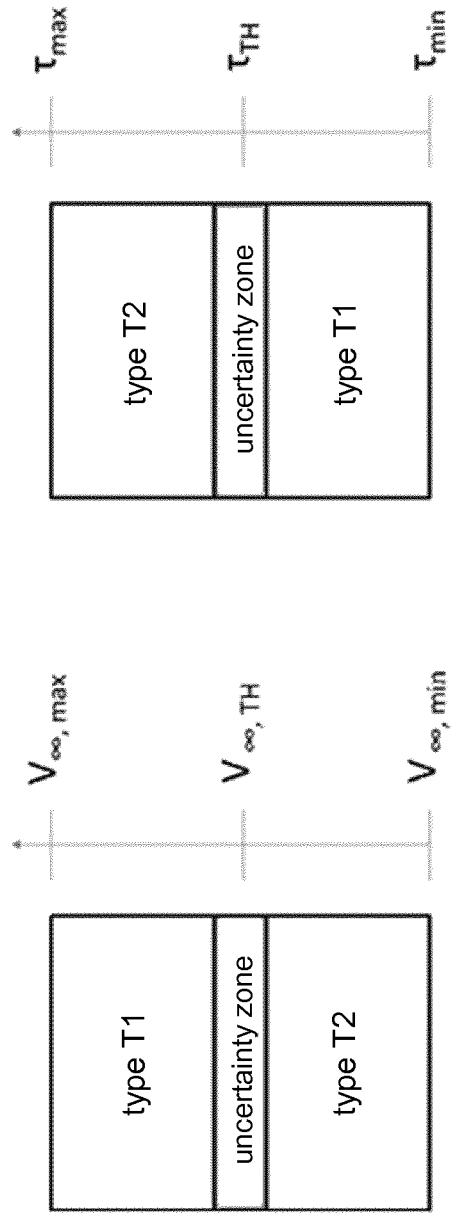
FIG. 5 shows in a schematic way an exemplary definition of two different types of coffee capsules which the system of FIG. 2 may be configured to recognize.

In the graphs of FIG. 5, $V_{\infty,max}$ and $V_{\infty,min}$ indicate the maximum and minimum considered asymptotic values, whereas $\tau_{,max}$ and $\tau_{,min}$ indicate the maximum and minimum considered saturation times. It may be appreciated that, if the coffee capsule 3 has e.g. an asymptotic value $V_\infty$ falling within the uncertainty zone separating T1 from T2, it is not possible to draw any conclusion about the coffee capsule 3. On the other hand, the same coffee capsule 3 may have a saturation time r definitely falling within the zone of e.g. T1. A recognition based (also) on the saturation time $\tau$ would therefore lead to a correct recognition of the coffee capsule 3.

Figure 6:
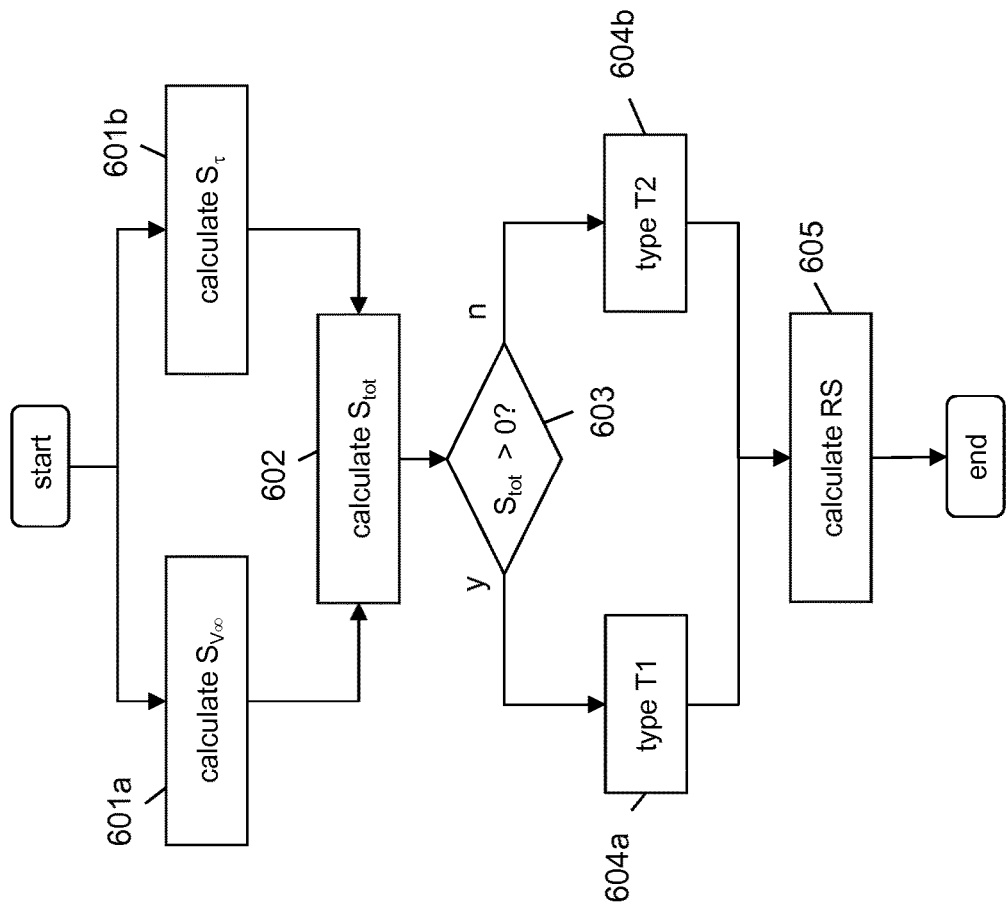
FIG. 6 is a flow chart of a second part of the recognition method implemented by the system of FIG. 2, according to an embodiment of the present invention.

For this reason, according to a particularly preferred embodiment, the processor 11 recognizes the coffee capsule 3 based on both the asymptotic value $V_\infty$ and the saturation time $\tau$. In particular, the processor 11 preferably applies the above clustering technique both to the asymptotic value $V_\infty$ and to the saturation time $\tau$, as described above. Then, the processor 11 combines the two clustering results, as it will be described in detail herein after with reference to the flow chart of FIG. 6.

First of all, the processor 11 preferably starts processing the data received from the coffee machine 2 upon reception of a trigger. The trigger may be provided under one or more of the following conditions:
  (i) detection of a certain event (e.g. reception of a certain predefined number of samples to be processed, each sample including the above described parameters $V_\infty$, $\tau$, $T_B$ determined for a certain coffee capsule);
  (ii) expiration of a timer;
  (iii) manual trigger by an operator.

Upon reception of the trigger, the processor 11 preferably starts two independent processes (herein after "first process" and "second process"), which may be executed by the processor 11 in parallel.

The first process comprises calculating—for each sample—a first partial score $S_{V\infty}$ indicative of how much the asymptotic value $V_\infty$ of the sample leans towards either the range of T1 or the range of T2 (step 601a).

To this purpose, the processor 11 first of all preferably determines whether the asymptotic value $V_\infty$ is higher than the threshold $V_{\infty,TH}$. If $V_\infty$ is higher than the threshold $V_{\infty,TH}$, at step 601a the first partial score $S_{V\infty}$ is preferably calculated according to the following equation:

$$S_{V\infty} = \frac{V_\infty - V_{\infty,TH}}{V_{\infty,MAX} - V_{\infty,TH}} \quad [6a]$$

If instead $V_\infty$ is not higher than the threshold $V_{\infty,TH}$, at step 601a the first partial score $S_{V\infty}$ is preferably calculated according to the following equation:

$$S_{V\infty} = \frac{V_\infty - V_{\infty,TH}}{V_{\infty,TH} - V_{\infty MIN}} \quad [6a']$$

The first partial score $S_{V\infty}$ is therefore positive if $V_\infty$ is higher than $V_{28,TH}$, otherwise it is negative. The higher its absolute value, the more $V_\infty$ leans towards one of the ranges of T1 or T2 (namely, the stronger is the indication on the capsule type provided by $V_\infty$).

Besides, the second process comprises calculating—for each sample —a second partial score $S_\tau$ indicative of how much the saturation time $\tau$ leans towards either the range of T1 or the range of T2 (step 601b).

To this purpose, the processor 11 first of all preferably determines whether the saturation time $\tau$ is lower than the threshold $\tau_{TH}$. If $\tau$ is lower than the threshold $\tau_{TH}$, at step 601b the second partial score $S_\tau$ is preferably calculated according to the following equation:

$$S_\tau = \frac{\tau_{TH} - \tau}{\tau_{TH} - \tau_{MIN}} \quad [6b]$$

If instead $\tau$ is not lower than the threshold $\tau_{TH}$, at step 601b the second partial score $S_\tau$ is preferably calculated according to the following equation:

$$S_\tau = \frac{\tau_{TH} - \tau}{\tau_{MAX} - \tau_{TH}} \quad [6b']$$

The second partial score $S_\tau$ is therefore positive if $\tau$ is lower than $\tau_{TH}$, otherwise it is negative. The higher its absolute value, the more $\tau$ leans towards one of the ranges of T1 and T2 (namely, the stronger is the indication on the capsule type provided by $\tau$).

The processor 11 then preferably calculates an overall score $S_{tot}$ (step 602), by combining the first partial score $S_{V\infty}$ calculated at step 601a and the second partial score $S_\tau$ calculated at step 601b.

In particular, step 602 preferably comprising calculating a linear combination of the partial scores $S_{V\infty}$ and $S_\tau$, namely:

$$S_{tot}' = W_{V\infty} \cdot S_{V\infty} + W_\tau \cdot S_\tau \quad [7]$$

wherein $W_{V\infty}$ and $W_\tau$ are weights whose values may be adjusted based on the weight that shall be given to each parameter $V_\infty$ and $\tau$ in the recognition decision.

The linear combination $S_{tot}'$ of the partial scores $S_{V\infty}$ and $S_\tau$ is then preferably normalized in the range $[-1; 1]$, thereby providing the overall score $S_{tot}$. In particular, if the absolute value of $S_{tot}'$ is lower than 1, the overall score $S_{tot}$ is preferably set equal to $S_{tot}'$. If, instead, the absolute value of $S_{tot}'$ is equal to or higher than 1, the overall score $S_{tot}$ is preferably set equal to $SGN(S_{tot}')$, where $SGN(x)$ is the sign function defined as follows:

$$SGN(x) = \begin{cases} -1 & \text{if } x < 0 \\ 0 & \text{if } x = 0 \\ 1 & \text{if } x > 0 \end{cases} \quad [8]$$

Then, the processor 11 preferably determines whether the considered coffee capsule is of type T1 or type T2 based on the overall score $S_{tot}$, in particular based on the sign of $S_{tot}$.

More particularly, the processor 11 preferably checks the sign of $S_{tot}$ (step 603). If the sign is positive, the processor 11 concludes that the coffee capsule is of type T1 (step 604a), otherwise it concludes that the coffee capsule is of type T2 (step 604b).

For instance, if the coffee capsule 3 has $V_\infty > V_{\infty,TH}$ and $\tau < \tau_{TH}$, both the partial scores $S_{V\infty}$ and $S_\tau$ are positive, thereby providing a positive value of the overall score $S_{tot}$ which will lead to recognize the coffee capsule 3 as belonging to type T1. If, instead, the coffee capsule 3 has $V_\infty < V_{\infty,TH}$ and $\tau > \tau_{TH}$, both the partial scores $S_{V\infty}$ and $S_\tau$ are negative, thereby providing a negative value of the overall score $S_{tot}$ which will lead to recognize the coffee capsule 3 as belonging to type T2.

If, for instance, the coffee capsule 3 has $V_\infty > V_{\infty,TH}$ and $\tau > \tau_{TH}$, the first partial score $S_{V\infty}$ is positive (indicating that the coffee capsule 3 is apparently of type T1) while the second partial score $S_\tau$ is negative (indicating that the coffee capsule 3 is apparently of type T2). The overall score $S_{tot}$ may accordingly be positive or negative, depending on the absolute values of the partial scores $S_{V\infty}$ and $S_\tau$ and the applied weights $W_{V\infty}$ and $W_\tau$. Assuming, by way of example, that the weights $W_{V\infty}$ and $W_\tau$ have a same value, $|S_{V\infty}| > |S_\tau|$ provides a positive value of $S_{tot}$, which will lead to recognize the coffee capsule 3 as belonging to type T1. $|S_{V\infty}| < |S_\tau|$ provides instead a negative value of $S_{tot}$, which will lead to recognize the coffee capsule 3 as belonging to type T2. In any case, the reliability of the recognition is lower than in the above cases, where both the $V_\infty$ and $\tau$ provide a same indication on the type of coffee capsule.

In order to provide a quantitative indication of the reliability of the coffee capsule recognition of the coffee capsule 3 based on the sign of the overall score $S_{tot}$, the processor 11 preferably calculates a reliability score RS (step 605).

Preferably, the reliability score RS is calculated based upon the absolute value of the total score $S_{tot}$. It may be indeed appreciated that when both $V_\infty$ and $\tau$ provide a same indication on the type of coffee capsule (e.g. $V_\infty > V_{\infty,TH}$ and $\tau < \tau_{TH}$) the recognition identification is more reliable—and the absolute value of $S_{tot}$ calculated as described above is higher—than when $V_\infty$ and $\tau$ provide different indications, the reliability—and the absolute value of $S_{tot}$ calculated as described above—increasing as the distance between $V_\infty$ and $\tau$ and the respective threshold $V_{\infty,TH}$ and $\tau_{TH}$ increases.

According to embodiments of the present invention, the reliability score RS is calculated according to the following equation:

$$RS = 100 \cdot \alpha \cdot |S_{tot}'| \% \quad [9]$$

where $\alpha$ is a correction factor ($0 < \alpha < 1$, e.g. $\alpha = 0.99$) introduced to avoid a reliability score RS=1, which would unrealistically indicate an absolute reliability of the coffee capsule recognition.

Preferably, the recognition results are then fed to the central database 15, where they are used as a feedback to implement an auto-learning process whereby the definitions of the types T1 and T2 of coffee capsules (in particular, the thresholds $V_{\infty,TH}$ and $\tau_{TH}$) are adjusted based on the past results, and therefore become even more accurate.

The system 1 for recognizing coffee capsules according to embodiments of the present invention therefore exhibits several advantages.

First of all, the system 1 advantageously does not require providing the coffee capsule 3 with any special feature for recognition purposes. The capsule recognition is indeed based on recognition of features (namely, $V_\infty$ and/or $\tau$) which are inherent to the coffee capsule 3 and exclusively depend on its behaviour during the brewing. Hence, advantageously, no extra manufacturing costs are needed in order to make the coffee capsule 3 recognizable.

Besides, advantageously, the system 1 basically does not require any costly or complex modification of the capsule coffee machine 2. The vibration sensor 10 is indeed a cheap component, which may be easily installed in the coffee machines 2 with a negligible increase of its cost and complexity.

Differently from a light sensor, moreover, the vibration sensor 10 may carry out its recognition function even if it is not positioned in the immediate vicinity of the coffee capsule 3 and capsule holder 22. It is indeed sufficient to position the vibration sensor 10 at any point of the unique, rigid system of which the coffee capsule 3 and capsule holder 22 are part. Hence, the vibration sensor 10 may be conveniently positioned far from the moist area of the coffee capsule 3 and capsule holder 22, in more a favourable environment (e.g. on the pump 21) where it may operate in a more proper and reliable way.

The Applicant has implemented a recognition system as the system 1, showing that it is particularly reliable and robust.

The tested recognition system comprised a vibration sensor LDT0-028K commercialized by MEAS Deutschland GmbH (Germany) placed on the pump of a capsule coffee machine, a Raspberry Pi 2B board as a pre-processor within the coffee machine, an ADC MCP3008 commercialized by Microchip Technology Inc. (Arizona, US) and the capability to house a Wi-Fi radio interface or a 3G interface.

Figure 1:
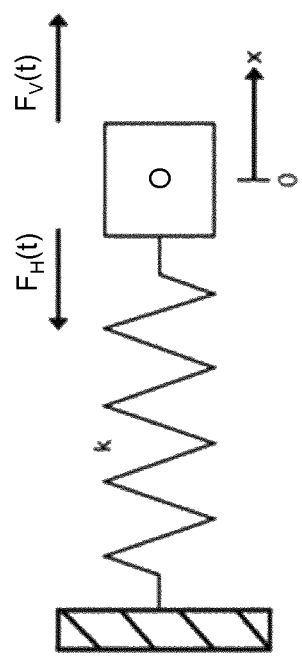
FIG. 1 (already described) schematically shows the model which has been used to predict the behaviour of the vibrating mechanical system comprising the coffee capsule to be recognized.

First of all, the recognition system has been tested for validating the above mathematical model of the behaviour of the rigid, variable mass mechanical system including pump, capsule holder and coffee capsule based on known dynamic equations (see FIG. 1 and related description).

Figure 7:
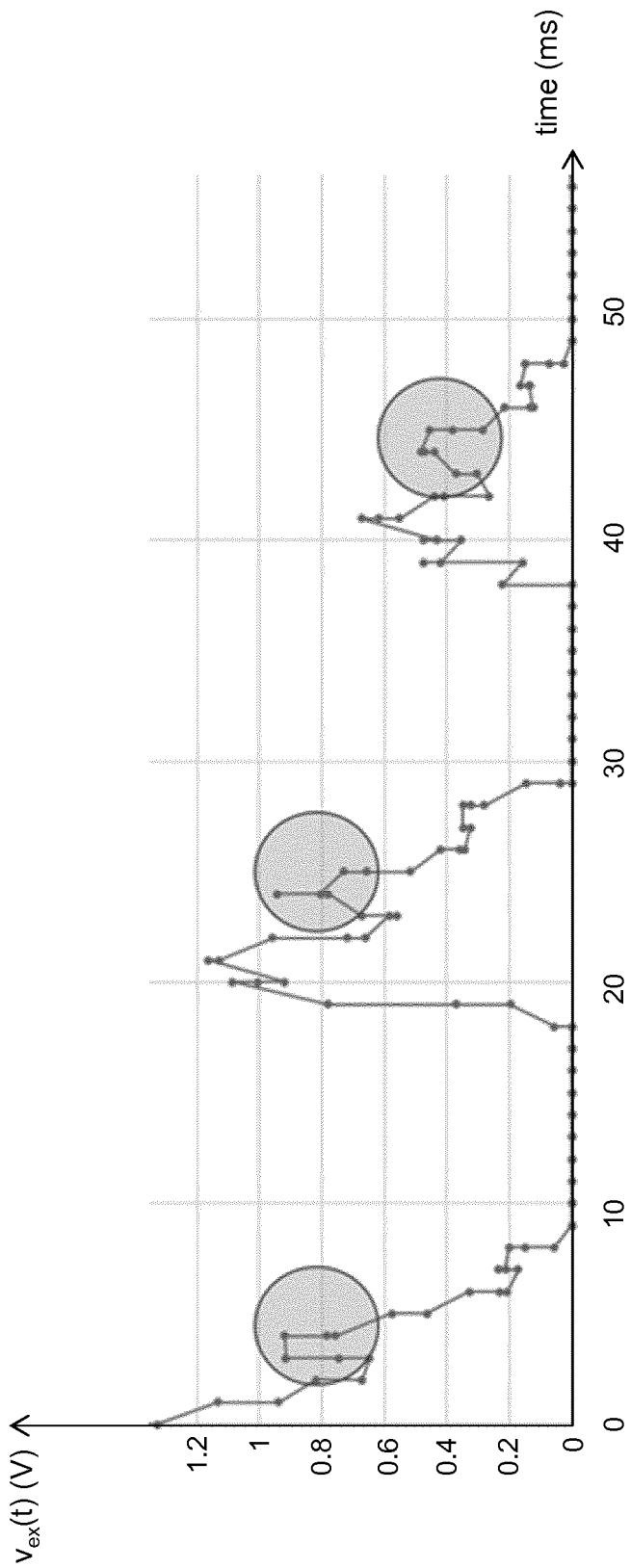
FIG. 7 shows an experimental vibration signal provided by the vibration sensor of a tested recognition system (positive half-wave only)

FIG. 7 shows an experimental graph of a portion of the vibration signal $v_{ex}(t)$ provided by the vibration sensor of the tested recognition system for an exemplary coffee capsule (for simplicity, only the positive half-wave is shown). It may be appreciated that, in agreement with the above described model, $v_{ex}(t)$ basically is a sinusoid with the same frequency as the mains electricity, namely 50 Hz. As shown in FIG. 7 (grey circles), each peak of the vibration signal $v_{ex}(t)$ is split in two, due to the natural angular frequency of the rigid, mechanical system of which the coffee capsule and capsule holder are part. Also the splitting of the peaks was predicted by the above described model shown in FIG. 1 and described above.

The recognition system has been then calibrated, in order to make it capable of distinguishing coffee capsules from a certain vendor (type T1) from coffee capsules from other vendors (type T2).

Figure 8:
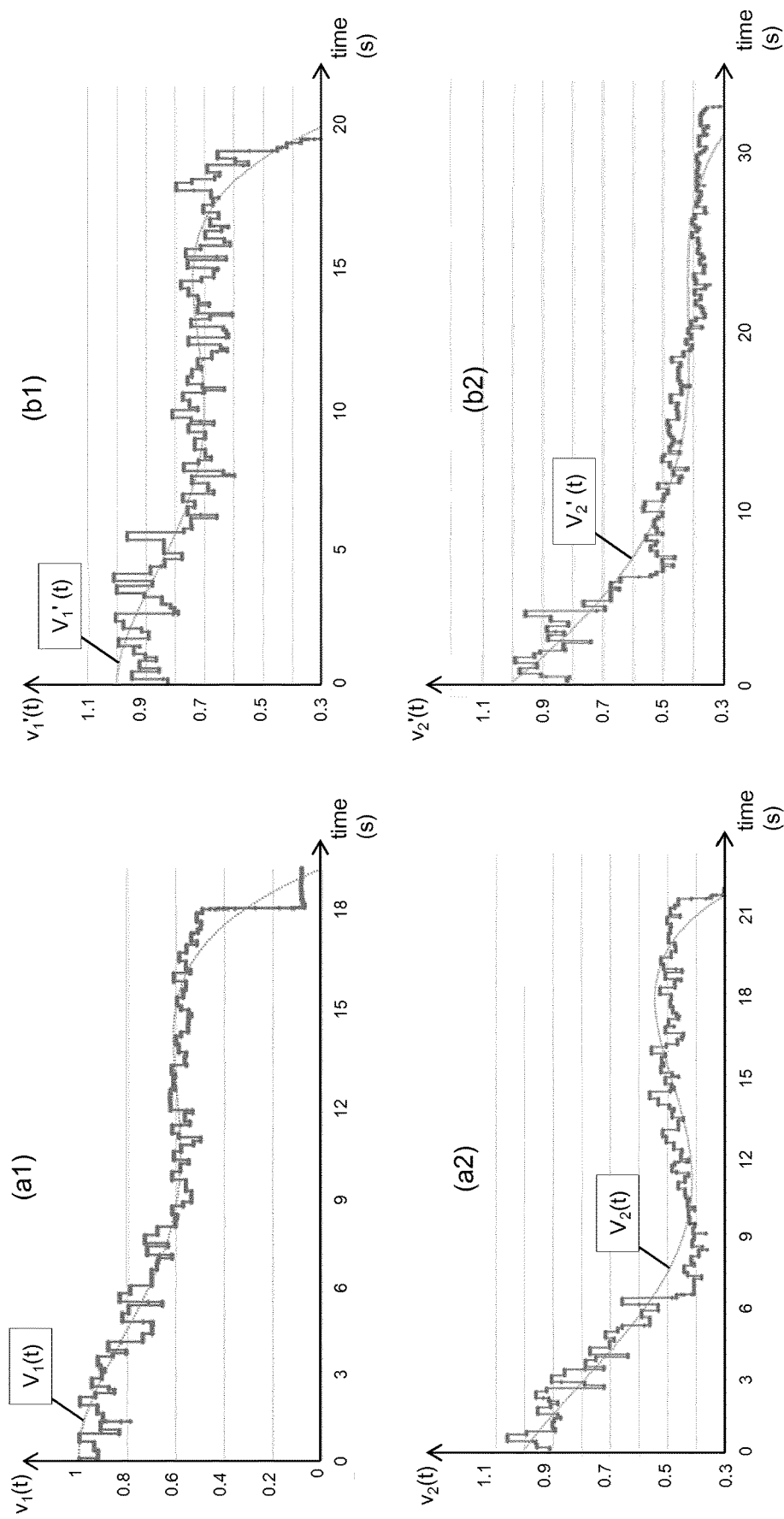
FIG. 8 shows other experimental vibration signals provided by the vibration sensor of the tested recognition system (positive half-wave only).

At this purpose, the asymptotic value $V_\infty$, the saturation time $\tau$ and the brewing duration $T_B$ have been measured for several coffee capsules of both types T1 and T2. FIG. 8 show exemplary vibration signals v(t) obtained under four different conditions (for simplicity, only the positive half-wave is shown):

- graphs (a1) and (a2): vibration signals $v_1(t)$, $v_2(t)$ for two exemplary coffee capsules of type T1 and T2, respectively, used to brew short coffee beverages (25-35 ml); and
- graphs (b1) and (b2): vibration signals $v_1'(t)$ and $v_2''(t)$ for two exemplary coffee capsules of type T1 and T2, respectively, used to brew weak coffee beverages (>35 ml).

For every graph, the vibration amplitude $V_1(t)$, $V_2(t)$, $V_1'(t)$, $V_2'(t)$ is also shown. It may be appreciated that, for all the graphs, the vibration amplitude $V_1(t)$, $V_2(t)$, $V_1'(t)$, $V_2'(t)$ exhibits the expected behaviour, namely it decreases from an initial value to an asymptotic value within a certain saturation time.

By analysing the asymptotic values and saturation times measured for several coffee capsules of types T1 and T2, it has been observed that coffee capsules of type T1 in general had an asymptotic value $V_\infty$ higher than coffee capsules of type T2 and a saturation time $\tau$ lower than coffee capsules of type T2, when short coffee beverages were brewed (see graphs (a1) and (a2) in FIG. 8).

In particular, the asymptotic value for coffee capsules of type T1 was generally higher than 0.62 V, while the asymptotic value for coffee capsules of type T2 was generally lower than 0.62 V. Besides, the saturation time for coffee capsules of type T1 was generally lower than 5 seconds, while the asymptotic value for coffee capsules of type T2 was generally higher than 5 seconds (with $\Delta V$ equal to $1.1 \cdot V_\infty$).

The same was observed also when weak coffee beverages were brewed, as it may be appreciated from the exemplary graphs (b1) and (b2).

Based on the above measurement results, a calibration of the recognition system was then performed, by setting the algorithm parameters as follows:

TABLE I

| | |
|---|---|
| $V_{\infty, TH}$ | 0.62 V |
| $V_{\infty, MIN}$ | 0.2 V |
| $V_{\infty, MAX}$ | 0.9 V |
| $\tau_{TH}$ | 5 s |
| $\tau_{MIN}$ | 2 s |
| $\tau_{MAX}$ | 16 s |
| $W_{V\infty}$ | 1 |
| $W\tau$ | 1 |

Then, the recognition system has been tested by trying to recognize a plurality of capsules of both type T1 and type T2. Some of the obtained results are set forth in the table herein below:

TABLE II

| ID | $V_\infty$ | $\tau$ | $S_{V\infty}$ | $S_\tau$ | $S_{tot}$ | determined type | RS | actual type |
|---|---|---|---|---|---|---|---|---|
| 1 | 0.6 | 3.78 | −0.05 | 0.41 | 0.36 | T1 | 35% | T1 |
| 2 | 0.42 | 6.16 | −0.49 | −0.11 | −0.59 | T2 | 59% | T2 |
| 3 | 0.4 | 15.92 | −0.52 | −0.99 | −1.00 | T2 | 99% | T2 |
| 4 | 0.39 | 6.97 | −0.55 | −0.18 | −0.73 | T2 | 73% | T2 |
| 5 | 0.36 | 9.94 | −0.62 | −0.45 | −1.00 | T2 | 99% | T2 |
| 6 | 0.69 | 2.54 | 0.28 | 0.82 | 1.00 | T1 | 99% | T1 |
| 7 | 0.70 | 3.71 | 0.30 | 0.43 | 0.73 | T1 | 72% | T1 |

The above results show that the recognition system is reliable and robust. All the coffee capsules have been correctly recognized.

It may be appreciated that, where both $V_\infty$ and $\tau$ has provided a same, strong indication of the type of coffee capsule (see e.g. IDs 3, 5 and 6), the partial scores $S_{V\infty}$ and $S_\tau$ had a same sign and had both a relatively high absolute value, so that the obtained reliability score RS was high (99%).

Where both $V_\infty$ and $\tau$ provided a same indication of the type of coffee capsule, but the indication of at least one of the two parameters was weak (which was the case for ID 4, where the indication of type T2 provided by $\tau$ was very weak, or ID 7, where the indications of type T1 provided by both $V_\infty$ and $\tau$ were both quite weak), the coffee capsules was correctly recognized, though with a lower reliability score RS (72-73%). In such cases, indeed, even if both the partial scores $S_{V\infty}$ and $S_\tau$ had a same sign, at least one of the two had a relatively low absolute value.

Also in cases where $V_\infty$ and $\tau$ provided contrasting indications of the type of coffee capsule (see e.g. IDs 1 and 2), the system was nonetheless capable of properly recognize the type. In such cases, however, the partial scores $S_{V\infty}$ and $S_\tau$ had different signs, so that the reliability score RS was much lower (35% and 59%).

In any case, the recognition system according to the present invention turned to be reliable and robust against noise and other disturbing factors.

While the invention has been described with specific reference to coffee machines and coffee capsules, the invention can be applied, more in general, to pressure infusion machines and pressure infusion capsules for brewing beverages starting from infusion of powders different from coffee, or combining coffee with some other substance.

The invention claimed is:

1. A method for recognizing a coffee capsule used by a capsule coffee machine, comprising:
   a) while a coffee beverage is brewed by said capsule coffee machine using said coffee capsule fitted therein, detecting vibrations of a component of said capsule coffee machine, said component being rigidly connected with said coffee capsule within said machine, and generating a vibration signal corresponding thereto;
   b) determining the value of at least one parameter of said vibration signal; and
   recognizing said coffee capsule based on said value of said at least one parameter.

2. The method according to claim 1, wherein said step a) comprises detecting vibrations of a pump of said capsule coffee machine while said pump is supplied by mains electricity, said pump being rigidly connected by means of a hydraulic circuit to a capsule holder of said capsule coffee machine, said coffee capsule being fitted in said capsule holder.

3. The method according to claim 2, wherein said step a) is performed by a vibration sensor arranged at said pump.

4. The method according to claim 1, wherein step b) comprises determining a vibration amplitude as an envelope of said vibration signal.

5. The method according to claim 4, wherein:
   step b) comprises determining the values of a first parameter and a second parameter of said vibration amplitude; and
   step c) comprises recognizing said coffee capsule based on the values of said first parametersaid second parameter of said vibration amplitude.

6. The method according to claim 5, wherein said first parameter comprises an asymptotic value of said vibration amplitude and said second parameter comprises a saturation time of said vibration amplitude.

7. The method according to claim 5, wherein said calculating said score comprises calculating a first partial score based on the value of said first parameter, calculating a second partial score based on the value of said second parameter and calculating said score by combining said first partial score and said second partial score.

8. The method according to claim 7, wherein said cot bining said first partial score and said second partial score comprises calculating a linear combination of said first partial score and said second partial score.

9. The method according to claim 1, wherein step c) comprises:
defining a first coffee capsule type as a first set of coffee capsules having said at least one parameter comprised in a first range;
defining a second coffee capsule type as a second set of coffee capsules having said at least one parameter comprised in a second range; and
determining whether said coffee capsule belongs to said first coffee capsule type or said second coffee capsule type based on whether said value of said at least one parameter determined for said coffee capsule is comprised in said first range or said second range.

10. The method according to claim 9, wherein step c) comprises:
calculating a score indicative of how much said value of said least one parameter determined for said coffee capsule leans towards said first range or said second range, said score being positive if said value of said at least one parameter leans towards said first range and said score being negative if said value of at said least one parameter leans towards said second range; and
determining whether said coffee capsule belongs to said first coffee capsule type or said second coffee capsule type based on a sign of said score.

11. The method according to any of claim 10, wherein step c) further comprises calculating a reliability score that provides a quantitative indication of the reliability of the coffee capsule recognition of said coffee capsule based on the sign of said score.

12. The method according to claim 11, wherein said reliability score is calculated based on an absolute value of said score.

13. The method according to claim 1, wherein said step b) is performed at said capsule coffee machine and said determined value of said at least one parameter of said vibration signal is transmitted by said capsule coffee machine to a remote processor by means of a network interface of said capsule coffee machine.

14. The method according to claim 13, wherein said network interface is a mobile radio interface.

15. A system for recognizing a coffee capsule used by a capsule coffee machine, comprising:
a vibration sensor configured to, while a coffee beverage is brewed by said capsule coffee machine using said coffee capsule fitted therein, detect vibrations of a component of said capsule coffee machine, said component being rigidly connected with said coffee capsule within said machine, and generate a vibration signal v(t) corresponding thereto;
a pre-processor configured to determine the value of at least one parameter of said vibration signal; and
a processor configured to recognize said coffee capsule based on said value of said at least one parameter.

* * * * *